United States Patent
Cashin et al.

(10) Patent No.: US 11,823,214 B2
(45) Date of Patent: Nov. 21, 2023

(54) CLASSIFYING FRAUD INSTANCES IN COMPLETED ORDERS

(71) Applicant: Maplebear, Inc., San Francisco, CA (US)

(72) Inventors: Sean Cashin, San Francisco, CA (US); Camille van Horne, San Francisco, CA (US); Maksim Golivkin, Oakland, CA (US); Benjamin Peyrot, San Francisco, CA (US)

(73) Assignee: Maplebear, Inc., San Francisco, CA (US)

( * ) Notice: Subject to any disclaimer, the term of this patent is extended or adjusted under 35 U.S.C. 154(b) by 90 days.

(21) Appl. No.: 17/128,161

(22) Filed: Dec. 20, 2020

(65) Prior Publication Data

US 2022/0198469 A1 Jun. 23, 2022

(51) Int. Cl.
*G06Q 30/018* (2023.01)

(52) U.S. Cl.
CPC .................. *G06Q 30/0185* (2013.01)

(58) Field of Classification Search
None
See application file for complete search history.

(56) References Cited

U.S. PATENT DOCUMENTS

| 9,009,834 B1* | 4/2015 | Ren | G06Q 30/0277 |
| | | | 709/224 |
| 2007/0088628 A1* | 4/2007 | Hopson | G06Q 30/0617 |
| | | | 705/26.81 |
| 2012/0130853 A1* | 5/2012 | Petri | G06Q 30/0609 |
| | | | 705/26.35 |
| 2013/0311230 A1* | 11/2013 | Kellstrand | G06Q 10/0635 |
| | | | 705/7.28 |
| 2014/0172634 A1* | 6/2014 | Dogin | G06Q 30/0633 |
| | | | 705/26.8 |
| 2014/0365348 A1* | 12/2014 | Ballaro | G06Q 30/0633 |
| | | | 705/30 |

(Continued)

OTHER PUBLICATIONS

D. Rahmawati, M. Ainul Yaqin and R. Sarno, "Fraud detection on event logs of goods and services procurement business process using Heuristics Miner algorithm," 2016 International Conference on Information & Communication Technology and Systems (ICTS), Surabaya, Indonesia, 2016, pp. 249-254, doi: 10.1109/ICTS.2016.*

*Primary Examiner* — Peter Ludwig
*Assistant Examiner* — Donald J Edmonds
(74) *Attorney, Agent, or Firm* — Fenwick & West LLP

(57) ABSTRACT

An online system receives a completed order of items fulfilled by a picker and a transaction log of the completed order from a retailer where the completed order was fulfilled. The online system compares the completed order of items to the transaction log of the completed order to identify one or more unmatched items. The online system generates, at an auditor client device, a user interface that shows the unmatched items and an option to mark each unmatched item as a fraud instance. The online system receives an indication of a fraud instance for one of the unmatched items from an auditor via the user interface. The online system adds a value of the fraud instance to a fraud total of the picker. If the online system determines that the fraud total for the picker exceeds a threshold, the fraud module deactivates the picker's account.

20 Claims, 9 Drawing Sheets

(56) References Cited

U.S. PATENT DOCUMENTS

| | | | |
|---|---|---|---|
| 2015/0026027 A1* | 1/2015 | Priess | G06Q 20/4016 |
| | | | 705/35 |
| 2015/0127414 A1* | 5/2015 | Geffert | G06Q 10/0635 |
| | | | 705/7.28 |
| 2016/0110703 A1* | 4/2016 | Herring | G07G 1/0045 |
| | | | 705/23 |
| 2017/0069013 A1* | 3/2017 | Castillo | G06Q 50/01 |
| 2017/0287053 A1* | 10/2017 | Page | G06Q 20/202 |
| 2019/0139375 A1* | 5/2019 | Herring | G06T 11/60 |
| 2020/0160428 A1* | 5/2020 | Calvo | G06Q 30/0633 |
| 2020/0311706 A1* | 10/2020 | Wood | A47F 9/048 |
| 2020/0387954 A1* | 12/2020 | Sadhankar | G07G 1/0036 |

* cited by examiner

User Interface 500

Unmatched Items 505

9873018341

| Details | Shopper Notes | Chat History |
|---|---|---|

| | |
|---|---|
| Order delivery number | 846, 853 |
| Shopper | Louisa A |
| Date | 9/28/20 |
| Number of items in batch | 37 |
| Number of items in POS | 36 |
| Unconfirmed items | 6 |
| Fraud items | 0 |
| Total amount in batch | $82.80 |
| Total amount billed in POS | $166.77 |
| Unconfirmed spread | $84.67 |
| Confirmed Fraud | $0.00 |
| View batches on admin | |

POS Group 510

Items — Mark all items as "Other"

In POS, missing from batch

| Name | Instructions | Quantity | Unit Price | Total Price | | | | Action |
|---|---|---|---|---|---|---|---|---|
| Fresh Mint Gum | None | 1 | $2.79 | $2.79 | Fraud | Wrong Item | | More options ⌄ |
| 12V Car Charging Cable | None | 1 | $9.46 | $9.46 | Fraud | Wrong Item | | More options ⌄ |
| Lavender Scent Sachet | None | 1 | $5.83 | $5.83 | Fraud | Wrong Item | | More options ⌄ |

In batch, missing from POS

| Name | Instructions | Quantity | Unit Price | Total Price | Action |
|---|---|---|---|---|---|
| Acetaminophen tablets | None | 1 | $9.22 | $9.22 | More options ⌄ |
| Instant Oatmeal | Do not get if... | 2 (under) | $1.99 | $3.98 | More options ⌄ |
| Tortilla Chips, Generic | None | 1 | $1.87 | $2.50 | More options ⌄ |

Batches Group 520

Batches

| Name | Instructions | Quantity | Unit Price | Total Price | Action |
|---|---|---|---|---|---|
| Apples, Gala | Be sure to grab... | 1 lb | $1.40 | $1.40 | More options ⌄ |

Fraud Button 525
Wrong Item Button 530
Options List 535
Order Group 515
Portion 540A
Details Tab 545
Fraud Total 550

FIG. 5

Portion 540B     Picker Notes Tab 600

9873018341

Details    | Shopper Notes |    Chat History

Emily G
Oct 8, 2020 – 9:05 am PDT
[Trust & Safety]: Shopper appeal reviewed. Decision upheld; shopper notified. Account remains deactivated

Gillian A
Oct 7, 2020 – 7:22 am PDT
[Trust & Safety]: Fraud – account suspended due to misuse of payment card

Tristan W
Oct 6, 2020 – 7:40 pm PDT
c/sh notice

Samantha W
Oct 4, 2020 – 3:43 pm PDT
Added manual padding of $4.00 USD for OrderDelivery #3473169

Joshua L
Oct 3, 2020 – 3:43 pm PDT
Added manual padding of $13.00 USD for OrderDelivery #3468765

Portion 540C     Chat History Tab 605

9873018341

Details    Shopper Notes    | Chat History |

Louisa A
Sept 28, 2020 – 8:31 pm PDT
I need your house number please

Blake O
Sept 28, 2020 – 8:33 pm PDT
1234 Lido Street

Louisa A
Sept 28, 2020 – 8:36 pm PDT
OK be right there

Portion 540D     Chat History Tab 605

9873018341

Details    Shopper Notes    | Chat History |

Blake O

Louisa A
Sept 28, 2020 – 8:31 pm PDT
I need your house number please

Blake O
Sept 28, 2020 – 8:33 pm PDT
1234 Lido Street

Louisa A
Sept 28, 2020 – 8:36 pm PDT
OK be right there

Kanishk T

Louisa A
Sept 27, 2020 – 12:13 pm PDT
The order is at your door

FIG. 6C

User Interface 700

| Transactions | | | | | | | Confirmed Fraud 710 |
|---|---|---|---|---|---|---|---|
| Shoppers | Q Search everything | | | | | | |
| | Viewing Louisa A Previous Next (BM) (JP) (E) Shopper Notes [Details] | | Transactions | | | | |
| | | | ID | Date ^ | Zone | Unconfirmed Spread | Confirmed Fraud |
| | Shopper ID | 3781870 | 780524250 | Nov 11, 2019 | Paso Robles, CA | $1.08 | $0.00 |
| | Status | Active | 780524103 | Nov 2, 2019 | Marin, CA | $57.67 | $0.00 |
| | Shopping zone | Marin, CA | 780524008 | Oct 19, 2019 | Marin, CA | $3.08 | $0.00 |
| | Shopper level | Veteran | 780523965 | Aug 8, 2019 | Marin, CA | $0.03 | $0.00 |
| | Unconfirmed items | 47 | 780523507 | Aug 7, 2019 | Paso Robles, CA | $10.23 | $0.00 |
| | Fraud items | 0 | 780523294 | Aug 3, 2019 | Marin, CA | $35.35 | $0.00 |
| | Unconfirmed spread | $627.75 | 780523111 | Jul 30, 2019 | Paso Robles, CA | $84.67 | $0.00 |
| | Confirmed fraud | $0.00 | | | | | |
| | View shopper on admin | | | | | | |

Orders 705

Fraud Total 715

FIG. 7

CLASSIFYING FRAUD INSTANCES IN COMPLETED ORDERS

BACKGROUND

This disclosure relates generally to classifying fraud instances. More particularly, the disclosure relates to determining a fraud total for a picker based on fraud instances in a completed order fulfilled by the picker.

In current online systems and mobile applications, pickers may commit instances of fraud when fulfilling orders. Such instances may occur when a picker purchases one or more items for a customer's order that were not specified by the customer. For example, a picker may receive an order for a customer from an online system and go to a store to collect items in the order. The online system may assign the order an estimated cost based on information about prices at the store and additional charges that may be incurred upon purchase, such as taxes, and maintain a buffer on the estimated price that the price could differ by when purchased. When purchasing the items, the picker may add a pack of gum for themselves at checkout, which impacts the price paid for the order. If the price of the pack of gum is low, the online system may mistake the actual price of the order as being the price paid due to the buffer. Thus, the picker may keep the pack of gum at the expense of the customer and/or online system, which would be considered fraud by the picker.

However, in some instances, a customer may request for a picker to add one or more items to the order while shopping or the picker may purchase a larger quantity of units of some items due to a promotion or other deal being offered at the store. When comparing items purchased at the retailer versus items ordered by a customer, the reasoning behind additional items being purchased may be difficult to discern. Therefore, a system for classifying instances of fraud is necessary.

SUMMARY

To classify instances of fraud in completed orders, an online concierge system compares a completed order of items fulfilled by a picker to a transaction log of the completed order from the retailer. The online concierge system generates a user interface showing unmatched items determined from the comparison at an auditor client device. If the online concierge system receives an indication of an instance of fraud (henceforth, referred to as a "fraud instance") via the user interface, the online concierge system adds a value of the fraud instance to a fraud total of the picker. If the picker's fraud total exceeds a threshold, the online concierge system deactivates the picker's account on the online concierge system such that the picker may no longer fulfill orders for customers.

More particularly, in some embodiments, the online concierge system receives, from a picker client device, a completed order of items fulfilled by a picker and receives a transaction log of the completed order from a retailer where the completed order was fulfilled. The online concierge system compares the completed order of items fulfilled by the picker to the transaction log of the completed order to identify one or more unmatched items. The online concierge system generates, at an auditor client device, a user interface that shows the unmatched items and an option to mark each unmatched item as a fraud instance. The online concierge system receives an indication of a fraud instance for one or the unmatched items via the user interface and adds, to a fraud total of the picker, a value of the fraud instance. Responsive to determining that the fraud total for the picker exceeds a threshold, the online concierge system deactivates an account of the picker.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 5 is a user interface showing unmatched items, according to one embodiment.

FIG. 6A is a portion of a user interface showing picker notes, according to one embodiment.

FIG. 6B is a portion of a user interface showing a chat history of a picker with a customer, according to one embodiment.

FIG. 6C is a portion of a user interface showing a comprehensive chat history of a picker, according to one embodiment.

FIG. 7 is a user interface showing orders fulfilled by a picker, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
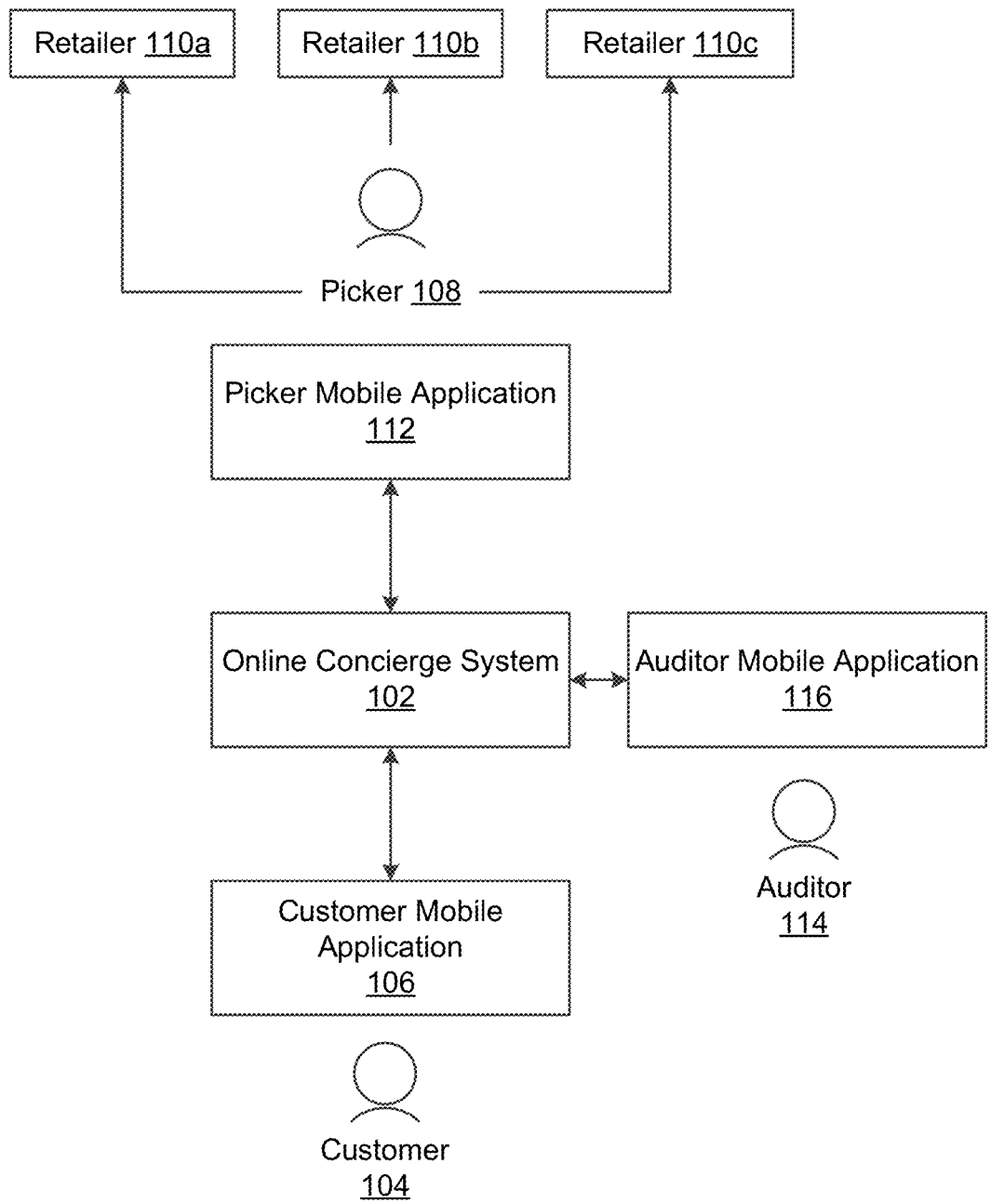
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. The retailers may also be referred to as warehouse locations. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

The environment 100 may also include one or more auditors 114. An auditor 114 may be a contractor, employee, or other person (or entity) who is enabled to review order information received by the online concierge system 102. The order information may include items ordered by a customer 104, items retrieved for the order by a picker 108, a receipt of the order, and the like. Based on the order information, the auditor 114 may determine whether a picker 108 has committed fraud when fulfilling orders for customer 104. In one embodiment, auditors 114 may use an auditor mobile application (AMA) 116, which is configured to interact with the online concierge system 102, to assess order information. The AMA 116 may be accessible as a mobile application on a client device or via a browser running on a computer device such as a computer.

Online Concierge System

Figure 2:
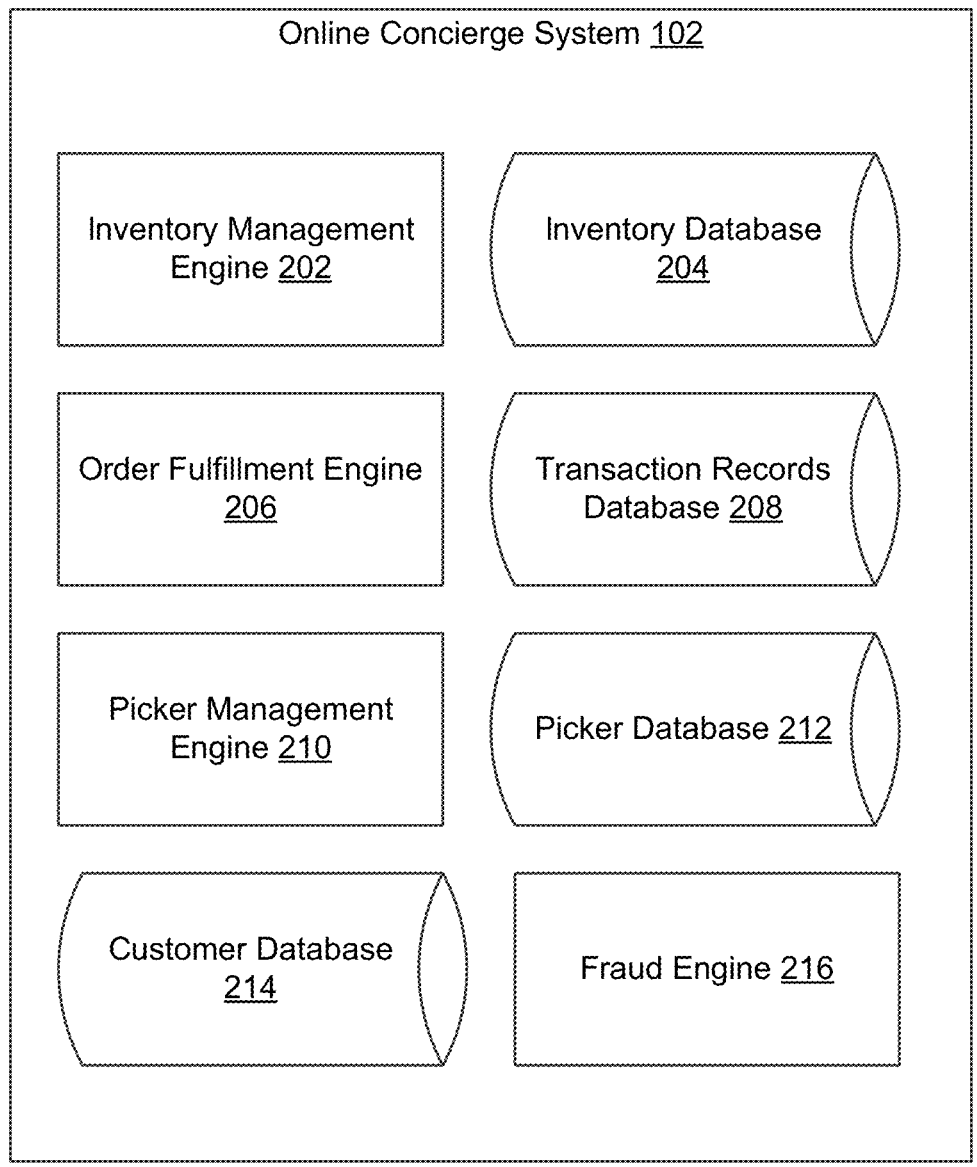
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

The online concierge system 102 may use a fraud engine 216 to detect fraud committed by one or more pickers 108. The fraud engine uses order information, such as a completed order of items fulfilled by a picker 108 and a transaction log of the completed order from the retailer 110 where the completed order was fulfilled, to determine a set of unmatched items. Unmatched items are items from the completed order that are not in the transaction log, or vice versa. Such unmatched items are sent to an auditor 114 for review, and the auditor 114 who determines whether the picker 108 committed fraud based on the unmatched items. If so, the fraud engine 216 adds to a fraud total of the picker 108, which is used to determine whether the picker's account on the online concierge system 102 should remain active or now. The fraud engine 216 is further described in relation to FIG. 4 below.

Figure 3A:
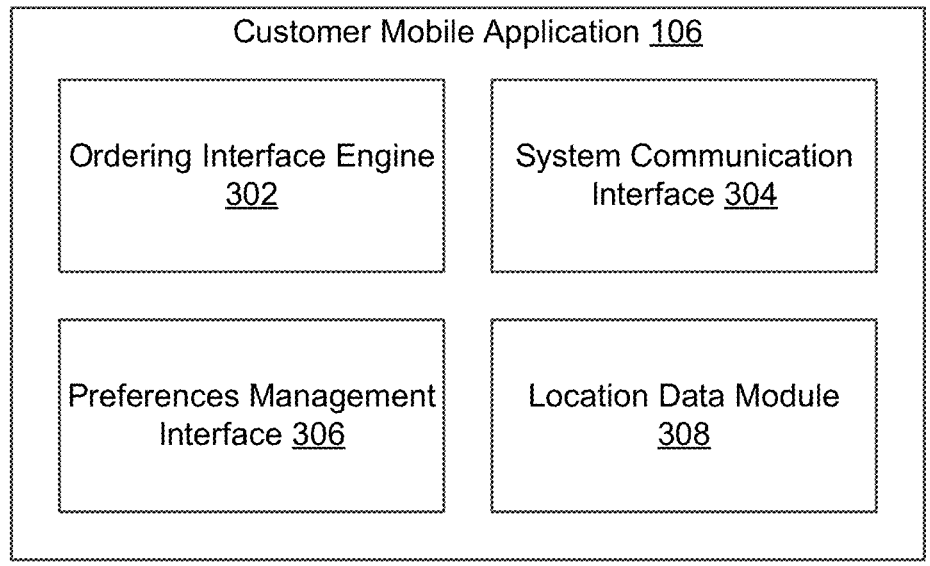
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through and select products and place an order.

Customers 104 may also use the customer ordering interface to message with pickers 108 and receive notifications regarding the status of their orders. Customers 104 may view their orders and communicate with pickers 108 regarding an issue with an item in an order using the customer ordering interface. For example, a customer 104 may respond to a message from a picker 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the picker 108. The customer 104 may edit the template message to include more information about the item or course of action and communicate back and forth with the picker 108 until the issue is resolved.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
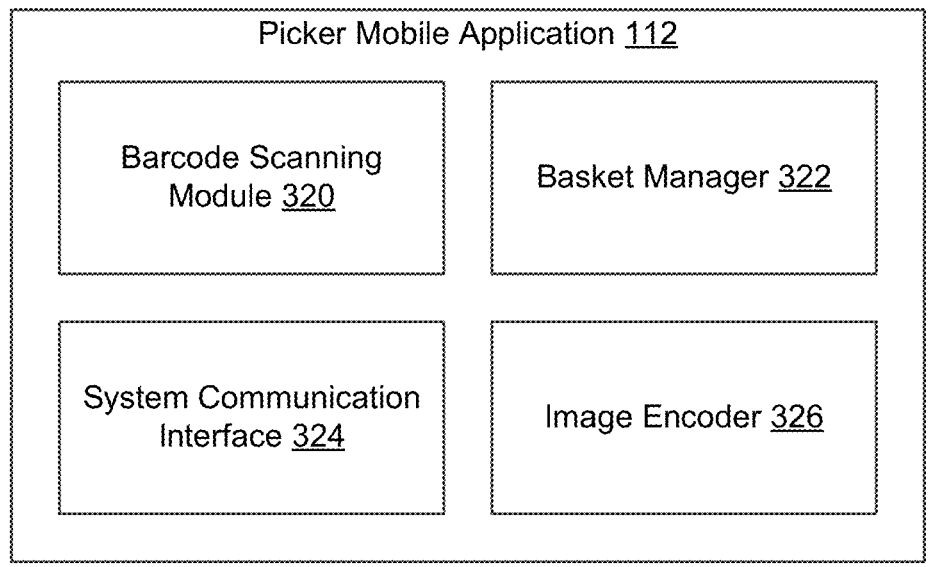
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may additionally generate a picker order interface to be transmitted via the PMA 112 to a picker to show orders submitted by customers 104 and messages from customers 104.

A picker order interface is an interactive interface through which pickers 108 may interact message with customers 104 and receive notifications regarding the status of orders they are assigned. Pickers 108 may view their orders through the picker order interface and indicate when there is an issue with an item in an order, such as the item being out of stock or of poor quality. A picker 108 may draft a message to a customer 104 associated with the order requesting clarification about what to do for the item given the issue. The picker order interface displays template messages for the picker 108 to choose from regarding the item and the picker 108 may edit the template message to include more information about the item or a question for the customer 104. The picker 108 communicate back and forth with the customer 104 until the issue is resolved.

In some embodiments, the PMA 112 also includes a preferences management interface which allows the picker 108 to manage basic information associated with his/her account, such as his/her name, preferred shopping zone, status, and other personal information. The preferences management interface 306 may also allow the picker 108 to review previous orders and/or his/her shopping level.

Figure 3C:
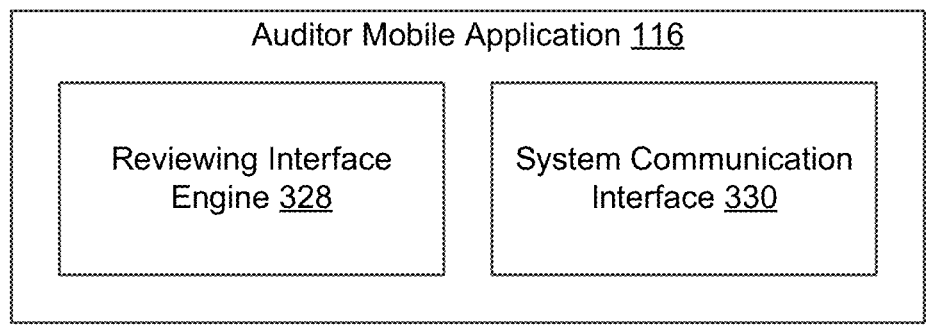
FIG. 3C is a block diagram of the auditor mobile application (AMA), according to one embodiment.

FIG. 3C is a block diagram of the auditor mobile application (AMA) 116, according to one embodiment. The auditor 114 accesses the AMA 116 via a client device, such as a mobile phone, tablet, laptop, or desktop computer. The AMA 116 may be accessed through an app running on the client device or through a website accessed in a browser. The AMA 116 includes a reviewing interface engine 328, which provides an interactive interface with which the auditor 114 can review order information. In some embodiments, the reviewing interface engine 328 may be stored at the fraud engine 216. The reviewing interface engine 328 is further described in relation to FIG. 4.

The AMA 116 also includes a system communication interface 304 which interacts with the online concierge system 102. For example, the system communication interface 330 receives information from the online concierge system 102 about pickers 108, such as whether an account of a picker 108 has been suspended due to fraudulent behavior.

Figure 4:
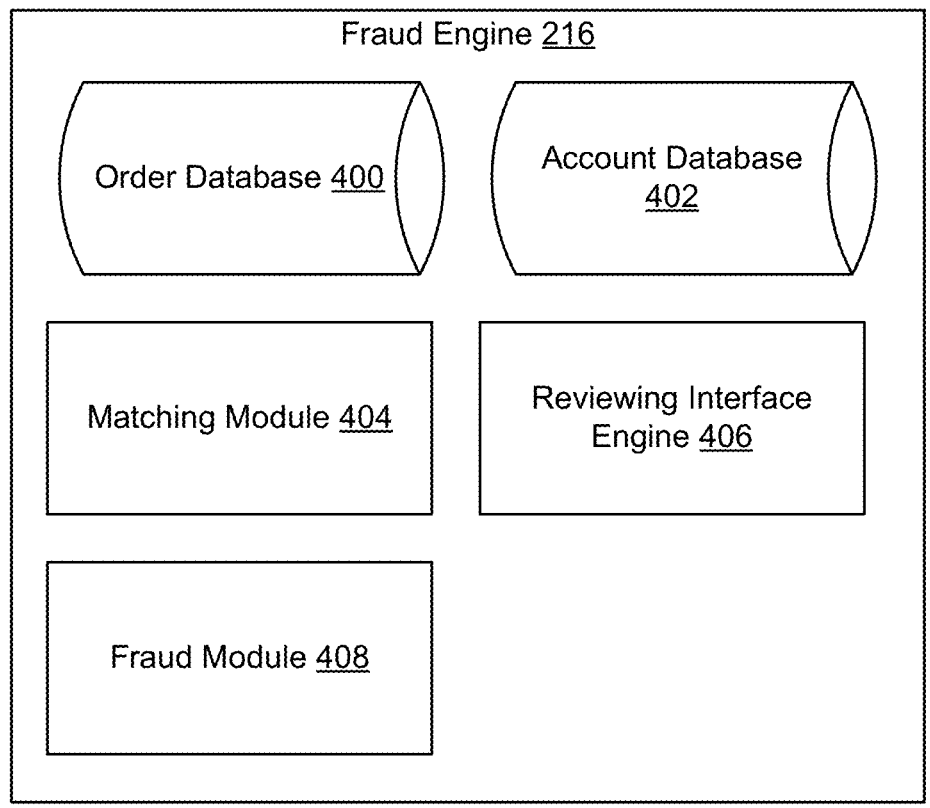
FIG. 4 is a block diagram of a fraud engine 216, according to one embodiment.

FIG. 4 is a block diagram of a fraud engine 216, according to one embodiment. The fraud engine 245 includes an order database 400, an account database 402, a matching module 404, an interface module 406, and a fraud module 408. In some embodiments, the fraud engine 216 has more or different components than those shown in FIG. 4. In other embodiments, the components shown in FIG. 4 may be combined or removed. Furthermore, in other embodiments, the methods and processes described in relation to the fraud engine 216 may be performed at other modules or systems.

The matching module 404 determines unmatched items in completed orders to items in transaction logs. In particular, the matching module 404 receives a completed order fulfilled by a picker 108 from the PMA 112 associated with the picker 108 and stores the completed order in the order database 400, which stores order information including the completed order. In other embodiments, the matching module 404 retrieves the completed order from the order database 400. A completed order includes items that a customer 104 selected to purchase from a retailer 110. Each item may be associated with a quantity of units of the item and instructions from the customer 104 about picking the item (e.g., "if Gala apples are not in stock, please replace with Granny Smith"). The completed order may also include an order identifier, a time the order was completed, chat messages between the picker 108 and the customer 104, a calculated price of the completed order, and prices of each item in the completed order. The price of each item may reflect the unit price of the item as advertised by the retailer 110 to the online concierge system 102 and may be correct or, in some cases, may be inaccurate and outdated. The price may also reflect a total price of the item (i.e., for items with a quantity of units of more than 1).

For a completed order, the matching module 404 receives a corresponding transaction log from the retailer 110 where the completed order was fulfilled and stores the transaction log in the order database 400 as order information for the completed order. In some embodiments, the matching module 404 retrieves the transaction log from the order database 400, where the online concierge system 102 may have already stored the transaction log upon receiving it from the retailer 110. The transaction log is a record of the items purchased for the completed order recorded by the retailer 110 where the completed order was fulfilled. The transaction log includes items purchased at the retailer 110, a quantity of units of each item, a time the items were purchased, a total price of the completed order, a price of each item purchased, and any other transaction information describing the purchase of the completed order at the retailer 110.

The matching module 404 compares the completed order of items fulfilled by the picker 108 to the transaction log of the completed order. For instance, the matching module may use language processing algorithms, artificial-intelligence-based data sorting and matching algorithms, trained neural networks, or any suitable matching method to compare the items listed in the completed order to the items listed in the transaction log. The matching module 404 determines a set of matched items, which are items that are in listed in both the completed order and the transaction log of the completed order, and a set of unmatched items, which are items that are only in either the completed order or the transaction log of the completed order, but not both. Unmatched items may also include items where the quantity of units of the items does not match between the completed order and the transaction log. For instance, the completed order may include the item "Sweet Farms Sugar" for "0.5 pounds," while the transaction log includes the item "Sweet Farms Sugar" for "1 pound." These items are unmatched items due to the difference in quantity. items "Sweet Farms Sugar" and "Winston's Sugar" are unmatched items. The matching module 404 may also stores the set of unmatched and the set of matched items in the order database 400 with the completed order and transaction log.

The reviewing interface engine 406 generates user interfaces for the AMA 116. In some embodiments, the reviewing interface engine 406 may generate user interfaces at the online concierge system 102 and transmits the user interfaces to the AMA 116. In other embodiments, the reviewing interface engine 406 may be stored at the AMA 116. The reviewing interface engine 406 receives a set of unmatched items from the matching module 404. In some instances, the reviewing interface engine 406 may also receive a set of matched items, completed order, and transaction log from the matching module 404. Alternatively, the reviewing interface engine 406 may retrieve the set of unmatched items, completed order, and/or transaction log from the order database 400.

The reviewing interface engine 406 generates a user interface depicting the set of unmatched items. Next to each unmatched item, the user interface includes a fraud button that an auditor 114 may interact with when presented with the user interface to indicate that a fraud instance occurred. A fraud instance denotes that the unmatched item represents fraud committed by the picker 108 while fulfilling the completed order. For example, the unmatched item "Lime Soda" in the transaction log may have been added to the completed order by the picker 108 for themselves to drink. Since the customer did not receive the item, the online concierge system 102 or retailer 110 would be charged for the item, even if the picker 108 drank it themselves. In another example, the completed order may include 1 bag of "General Brand Tortilla Chips," but the transaction log may include 2 bags of "General Brand Tortilla Chips." If the transaction log also shows that the price of the "General Brand Tortilla Chips" reflects an in-store deal that lowers the price of the "General Brand Tortilla Chips," such as a "buy 1 get 1 free" deal, then the extra bag of "General Brand Tortilla Chips" may not be a fraud instance committed by the picker 108. Other examples of fraud instances are further described in relation to FIG. 5.

The user interface may include a plurality of interactive elements for an auditor 114 to interact with in relation to the picker 108, the completed order, and/or the transaction log. The interactive elements allow an auditor 114 to take action with respect to one or more unmatched items. Such actions allow the auditor to indicate whether an unmatched item constitutes a fraud instance, was incorrectly flagged as unmatched, was added with the permission of the customer 104, and the like. Further, the reviewing interface engine 406 may also generate other user interfaces that depict unmatched items from other orders completed by the picker 108, statistics about the picker's performance fulfilling orders, chat messages between the picker 108 and customers 104, other information about the completed order. These elements and user interfaces are further described in relation in FIG. 5.

When the reviewing interface engine 406 receives, via an interaction with the fraud button, an indication of a fraud instance, the reviewing interface engine 406 sends the indication of the fraud instances to the fraud module 408. For other interactions received via interactive elements, the reviewing interface engine 406 may update the order information in the order database 400 to reflect that the picker 108 did not commit fraud, an item was added to the completed order with permission from the customer 104, the item has a matching item in the completed order or transaction log, and the like.

The fraud module 408 receives indications of fraud instances from the reviewing interface engine 406. The indications may each include the unmatched item. The fraud module 408 may also receive order information from the reviewing interface engine 406 or may access the order information from the order database 400. The fraud module 408 accesses the account of the picker 108 who fulfilled the completed order from the account database 402. The account may indicate a name of the picker 108, a picker identifier, a status of the picker 108 (i.e., "active," "suspended," etc.), a shopping zone (i.e., city, county, state, etc. where the picker tends to fulfill orders), a picker level (e.g., "amateur," "expert," etc.), notes describing activity on the picker's account (e.g., account suspensions, orders fulfilled, etc.), a number of unmatched items associated with the picker 108, and a number of fraud instances associated with the picker 108. The account may also indicate an unconfirmed spread of the picker 108, which is a value representing the amount of money the picker 108 may have cost the online concierge system 102 based on their unmatched items, and a fraud total of the picker 108, which is a value representing the amount of money the picker 108 has cost the online concierge system 102 based on their fraud instances.

For each indication of a fraud instance, the fraud module 408 determines a value of the fraud instance. For instance, the value may be a price of the unmatched item of the fraud instance. The fraud module 408 adds the value of the fraud instance to the fraud total of the picker 108 and stores the fraud total with the picker's account. Once the fraud module 408 has added the value of each fraud instance to the fraud total, the fraud module 408 compares the fraud total to a fraud threshold. If the fraud total exceeds the fraud threshold, the fraud module 408 may deactivate or suspend the picker's account, such that the picker 108 may not fulfill orders for customer 104. The fraud module 408 may send an indication of the deactivation to the PMA 112, which notifies the picker 108 of the deactivation. In some embodiments, the fraud module 408 may additionally compare the fraud total to a warning threshold. If the fraud total is above the warning threshold, but below the fraud threshold, the fraud module 408 may send a warning message to the picker 108 regarding their fraud instances. The fraud module 408 may additionally store a record of warnings and indications sent to the picker 108 based on their fraud instances in relation to the picker's account.

The fraud module 408 may receive appeal indications from the PMA 112. If the fraud module 408 receives an indication from the PMA 112 that the picker 108 would like to appeal suspension or deactivation of their account, the fraud module 408 retrieves appeal information from the order database 400 and the picker's account. The appeal information may include a set of unmatched items and fraud instances associated with the picker 108. The fraud module 408 sends the appeal information to the reviewing interface engine 406 for display to an auditor 114 via a user interface. An example of the user interface is shown in FIG. 7. If an auditor determines that the picker's account should not have been deactivated or that one or more fraud instances were not actually fraud, the auditor 114 may issue a remediation indication to the fraud module 408 via the user interface. Responsive to receiving a remediation indication, the fraud module 408 may reactivate the picker's account and update the picker's fraud instances and fraud total to based on the auditor's assessment.

In some embodiments, the fraud module 408 may employ one or more machine learning models (henceforth referred to collectively as "machine learning models") to determine fraud instances that occurred. In these embodiments, the fraud module 408 receives a set of unmatched items, a completed order, and a transaction log from the matching module 404, which the fraud module inputs to the machine learning models. The machine learning models may be one or more of classifiers, regression models, neural networks, and the like. The fraud module 408 receives a likelihood for each of the one or more unmatched items in the set that the unmatched item represents a fraud instance. The fraud module 408 selects unmatched items with a likelihood over a fraud threshold as representing fraud instances. In some embodiments, the fraud module 408 may send these fraud instances to the reviewing interface engine 406 for presentation to an auditor 112 via a user interface. If the auditor confirms the fraud instances, the fraud module 408 determines a value of each fraud instance and adds the values to a fraud total of the picker 108 associated with the fraud instances. In other embodiments, the fraud module 408 automatically determines and adds a value of each fraud instance without input from an auditor 112.

The machine learning models may be trained on training data captured by the online system. The training data may include unmatched items labeled as fraud instances or not based on input received by the reviewing interface engine 406 from auditors 114. The unmatched items may additionally be labeled with a completed order, transaction log, chat messages between a picker 108 who fulfilled the completed order and a customer 104 who placed the completed order, and the like. The fraud module 408 may train the machine learning models using this training data or a separate training module may be used to train the machine learning models.

In additional embodiments, the fraud module may employ an additional machine learning model (or, in some cases, multiple machine learning models) to determine a likelihood of a picker committing fraud based on their behavior on the online concierge system 102. For instance, the fraud module 408 may input a picker's account, chat history, previously completed orders fulfilled by the picker, and the like into the additional machine learning model. The machine learning model may output a likelihood that the picker has or will commit fraud. If the likelihood is above a threshold value, the fraud module 408 may send information describing the picker (e.g., the picker's account, chat history, etc.) to an auditor 114 for review via the reviewing interface engine 406. Furthermore, the fraud module 408 (or a separate training module) may train the additional machine learning model on information describing pickers labeled as fraudulent or not.

FIG. 5 is a user interface 500 showing unmatched items 505, according to one embodiment. The unmatched items are sorted into one or more groups. Such groups include a POS group 510, an order group 515, and a batches group 520. The POS group 510 includes unmatched items found in the transaction log of the completed order but missing from the completed order. The order group 515 includes unmatched items found in the completed order received from the picker but not but missing from the transaction log. The batches group 520 is the entire completed order stored at by the online concierge system 102. In some embodiments, the batches group 520 may include multiple orders fulfilled by the same picker 108 for the same customer 104. In these embodiments, the POS group 510 and order group 515 may include unmatched items 505 related to the other orders based on their transaction logs and completed orders.

The unmatched items 505 are each listed in the user interface 500 in their respective groups, along with instructions given by the customer in the completed order for the unmatched items 505, a quantity of units of the unmatched item 505, a unit price of the unmatched item 505, and a total price of the unmatched item 505. Each unmatched item is also displayed with a fraud button 525 and a wrong item button 530. An auditor 114 may interact with the fraud button 525 to indicate that the unmatched item 505 constitutes a fraud instance. The auditor 114 may interact with the wrong item button 530 to indicate that the unmatched item 505 is similar to another unmatched item 505. For example, the item "Fresh Mint Gum" from the POS group 510 may be similar to the unmatched item 505 "Sporty Mint Gum" in the order group. The auditor 114 may interact with the wrong item button 530 to indicate that the picker 108 replaced the "Fresh Mint Gum" with the "Sporty Mint Gum," likely because they could not find the "Fresh Mint Gum." In this scenario, the picker 108 was not committing fraud but rather attempting to fulfill the completed order based on items available at the retailer 110.

Each unmatched item 505 is also associated with an options list 535, which is a dropdown menu that an auditor 114 may interact with to select more actions for the unmatched item 505. For unmatched items 505 in the POS group 510, such actions allow the auditor 114 to indicate that the unmatched item 505 was purchased by request of the customer 104, the picker 108 purchased the unmatched item 505 as authorized by the customer 104 but did not indicate so via the PMA 112, the picker 108 purchased extra units of the unmatched item 505 as part of a promotion, the auditor 114 is uncertain why the unmatched item 505 is unmatched with the information given in the user interface 505, or unmatched item 505 should not be in the POS group 510 (e.g., the unmatched item 505 is being shown in the POS group 510 by error). For unmatched items 505 in the order group 515, the actions in the options list 535 allow the auditor 114 to indicate that the customer 104 wanted a refund instead of a replacement for an ordered item, the picker 108 forgot to purchase the unmatched item 505, or the picker 108 retrieved less units of the unmatched item than requested by the customer 104.

The user interface 500 also includes a portion 540A with a details tab 545, which the auditor 114 may interact with to see detail information about the completed order, unmatched items 505, and picker 108. The details tab 545 may be toggled between other tabs that allow the auditor 114 to see notes from the picker 108 about the completed order or a chat history between the picker 108 and the customer 104. The detail information may include an identification number of the completed order, a name of the picker 108, a date the completed order was fulfilled, a number of items in the completed order, a number of items in the transaction log for the completed order, a number of unmatched items 505, a number of unmatched items 505 marked as fraudulent, a total price of the completed order, a total amount spent at the retailer 110 reflected by the transaction log. The detail information may also include an unconfirmed spread of the picker 108, which reflects a monetary value of the unmatched items associated with the picker 108, and a fraud total 550, which reflects a monetary value of fraud instances committed by the picker 108. For example, if the auditor 114 marked the item "Fresh Mint Gum" as being a fraud instance via the user interface 500, the picker 108 would be associated with a fraud total 550 of $2.79, which is the price of the "Fresh Mint Gum."

FIGS. 6A-6C depict the portion 540 of the user interface 500 showing picker notes and the picker's chat history, according to one embodiment. Particularly, FIG. 6A depicts the portion 540B showing picker notes under the picker notes tab 600. The picker notes are textual information describing actions the picker 108 took while fulfilling orders (e.g., adding money to orders), warnings sent to the picker 108 about their activity fulfilling orders, suspension of the picker's account, and reactivation of the picker's account. In other embodiments, the picker notes may include more information about the picker's activity via the online concierge system 102.

FIG. 6B depicts the portion 540C showing a chat history of messages between the picker 108 and a customer 104, according to one embodiment. The chat history, which the auditor 114 may view by interacting with the chat history tab 605, includes messages sent for an order, which may be identified with an identification number. Each message is associated with who sent the message (e.g., the picker 108 or eth customer 104), a time and date the message was sent, and text of the message. As shown in FIG. 6C, the portion 540D may show a comprehensive chat history of the picker 108 with multiple customers 104. In this case, the messages may be organized by customer 104 name or any other organizational structure.

FIG. 7 is a user interface showing orders 705 fulfilled by a picker 108, according to one embodiment. The orders 705 are each listed with an identification number, a date the order 705 was fulfilled, a zone where the order 705 was fulfilled, the unconfirmed spread of the order 705, and a confirmed fraud 710, which represents the monetary value of a fraud instance committed by the picker 108 for the order 705. The user interface 700 also include information about the picker 108, such as a picker identifier, a status of the picker 108, a zone where the picker 108 generally fulfills orders 705, a shopping level of the picker 108, a unconfirmed spread of the picker 108, and a fraud total 715 of the picker 108. The fraud total 715 of the picker 108 may be the sum of the confirmed fraud 710 of each order 705 fulfilled by the picker 108. The user interface 700 may further include a toggle to see notes take by the picker 108 about each order 705, auditor identifiers identifying auditor's viewing the orders fulfilled by the picker 108 in real-time, and other buttons that allow an auditor 114 to navigate the user interface 700 to view more information about the picker 108. In some embodiments, an auditor 114 may view this user interface 600 via an auditor client device when assessing the deactivation or suspension of a picker's account in response to receiving an appeal indication from the picker 108.

Figure 8:
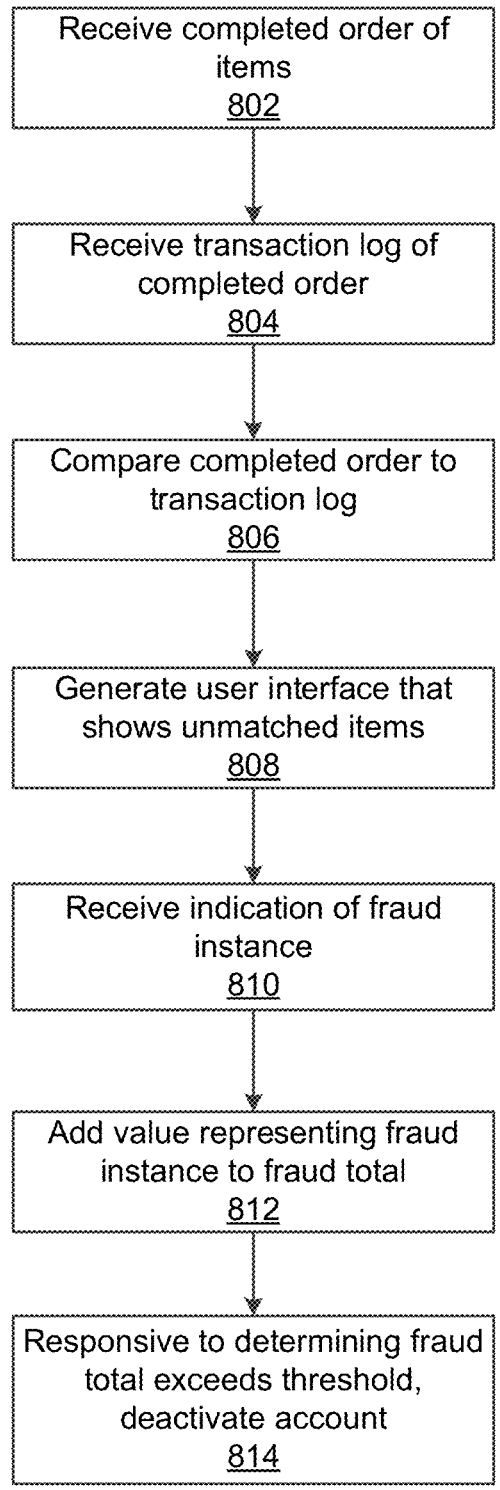
FIG. 8 is a flowchart illustrating a process for deactivating a picker's account, according to one embodiment.

FIG. 8 is a flowchart illustrating a process for deactivating a picker's account, according to one embodiment. Though reference is made to the online concierge system 102 for this process 600, the process 600 can be used by other online systems or mobile applications for deactivating a picker's account based on a fraud total.

The matching module 404 receives a completed order of items from a picker client device. The completed order of items was fulfilled by a picker 108, who is associated with the picker client device, at a retailer 110. The matching module 404 also receives a transaction log of the completed order from the retailer 110. The matching module 404 compares the completed order of items fulfilled by the picker 108 to the transaction log of the completed order to identify one or more unmatched items 505.

The reviewing interface engine 406 generates, at an auditor client device, a user interface 500 that shows the unmatched items 505 and an option to mark each unmatched item as a fraud instance. The reviewing interface engine 406 receives an indication of a fraud instance for one of the unmatched items 505 from an auditor via the user interface 500. The fraud module 408 adds a value of the fraud instance to a fraud total of the picker 108. If the fraud module 408 determines that the fraud total for the picker 108 exceeds a threshold, the fraud module 408 deactivates the picker's account.

It is appreciated that although FIG. 8 illustrates a number of interactions according to one embodiment, the precise interactions and/or order of interactions may vary in different embodiments. For example, in some embodiments, the reviewing interface engine 406 may generate a user interface at the auditor client device displaying fraud instance associated with the picker 108 responsive to receiving an appeal from the picker 108 regarding the deactivation.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving, from a picker client device having a picker application installed thereon, a first list of items associated with a customer order fulfilled by a picker, wherein the picker application is configured to obtain one or more items in the customer order, and enter each item when the picker places the corresponding item in a shopping cart based on the customer order to generate the first list;
receiving a transaction log associated with the customer order from an inventory system of a retailer where the customer order was fulfilled, the transaction log comprising a second list of items purchased by the picker from the retailer;
comparing the first list of items and the second list of items to identify one or more unmatched items;
generating, at an auditor client device having an auditor application installed thereon, a user interface that shows the unmatched items and an option to mark each unmatched item as a fraud instance;
receiving an indication of a fraud instance for one of the unmatched items via the user interface;
adding, to a fraud total of the picker, a value of the fraud instance; and
using the received fraud instance as a training example to train a fraud detection machine learning model, wherein the fraud detection machine learning model is trained to:
receive an unmatched item as input,
determine a likelihood of the unmatched item being a fraud instance, and
responsive to determining that the likelihood is greater than a threshold, classify the unmatched item as a fraud instance.

2. The computer-implemented method of claim 1, wherein the user interface further comprises a chat history of messages between the picker and a customer who placed the customer order.

3. The computer-implemented method of claim 1, wherein the user interface further comprises the fraud total of the picker.

4. The computer-implemented method of claim 3, wherein the user interface further comprises a list of orders fulfilled by the picker.

5. The computer-implemented method of claim 1, wherein the user interface further comprises an unconfirmed spread of the picker, wherein the unconfirmed spread indicates a total value of unmatched items in orders fulfilled by the picker.

6. The computer-implemented method of claim 1, further comprising:
responsive to determining that the fraud total for the picker exceeds a threshold, deactivating an account of the picker; and
responsive to receiving an appeal indication from the picker regarding deactivation of the account of the picker, displaying, via the user interface at the auditor client device, fraud instances associated with the picker.

7. The computer-implemented method of claim 6, further comprising:
responsive to receiving a remediation indication from the auditor client device, reactivating the account of the picker.

8. A non-transitory computer-readable storage medium comprising instructions executable by a processor, the instructions comprising:
instructions for receiving, from a picker client device having a picker application installed thereon, a first list of items associated with a customer order fulfilled by a picker, wherein the picker application is configured to obtain one or more items in the customer order, and enter each item when the picker places the corresponding item in a shopping cart based on the customer order to generate the first list;
instructions for receiving a transaction log associated with the customer order from an inventory system of a retailer where the customer order was fulfilled, the transaction log comprising a second list of items purchased by the picker from the retailer;
instructions for comparing the first list of items and the second list of items to identify one or more unmatched items;
instructions for generating, at an auditor client device having an auditor application installed thereon, a user interface that shows the unmatched items and an option to mark each unmatched item as a fraud instance;
instructions for receiving an indication of a fraud instance for one of the unmatched items via the user interface;
instructions for adding, to a fraud total of the picker, a value of the fraud instance;
responsive to determining that the fraud total for the picker exceeds a threshold, instructions for deactivating an account of the picker;
instructions for using the received fraud instance as a training example to train a fraud detection machine learning model, wherein the fraud detection machine learning model is trained to:
receive an unmatched item as input,
determine a likelihood of the unmatched item being a fraud instance, and
responsive to determining that the likelihood is greater than a threshold, classify the unmatched item as a fraud instance.

9. The non-transitory computer-readable storage medium of claim 8, wherein the user interface further comprises a chat history of messages between the picker and a customer who placed the customer order.

10. The non-transitory computer-readable storage medium of claim 8, wherein the user interface further comprises the fraud total of the picker.

11. The non-transitory computer-readable storage medium of claim 10, wherein the user interface further comprises a list of orders fulfilled by the picker.

12. The non-transitory computer-readable storage medium of claim 8, wherein the user interface further comprises an unconfirmed spread of the picker, wherein the unconfirmed spread indicates a total value of unmatched items in orders fulfilled by the picker.

13. The non-transitory computer-readable storage medium of claim 8, the instructions further comprising:
responsive to determining that the fraud total for the picker exceeds a threshold, deactivating an account of the picker; and
responsive to receiving an appeal indication from the picker regarding deactivation of the account of the picker, instructions for displaying, via the user interface at the auditor client device, fraud instances associated with the picker.

14. The non-transitory computer-readable storage medium of claim 13, the instructions further comprising:
responsive to receiving a remediation indication from the auditor client device, instructions for reactivating the account of the picker.

15. A computer system comprising:
a computer processor; and a non-transitory computer-readable storage medium storing instructions that when executed by the computer processor perform actions comprising:
receiving, from a picker client device having a picker application installed thereon, a first list of items associated with a customer order fulfilled by a picker, wherein the picker application is configured to obtain one or more items in the customer order, and enter each item when the picker places the corresponding item in a shopping cart based on the customer order to generate the first list;
receiving a transaction log associated with the customer order from an inventory system of a retailer where the customer order was fulfilled, the transaction log comprising a second list of items purchased by the picker from the retailer;
comparing the first list of items and the second list of items to identify one or more unmatched items;
generating, at an auditor client device having an auditor application installed thereon, a user interface that shows the unmatched items and an option to mark each unmatched item as a fraud instance;
receiving an indication of a fraud instance for one of the unmatched items via the user interface;
adding, to a fraud total of the picker, a value of the fraud instance; and
using the received fraud instance as a training example to train a fraud detection machine learning model, wherein the fraud detection machine learning model is trained to:
receive an unmatched item as input,
determine a likelihood of the unmatched item being a fraud instance, and
responsive to determining that the likelihood is greater than a threshold, classify the unmatched item as a fraud instance.

16. The computer system of claim 15, wherein the user interface further comprises a chat history of messages between the picker and a customer who placed the customer order.

17. The computer system of claim 15, wherein the user interface further comprises the fraud total of the picker.

18. The computer system of claim 17, wherein the user interface further comprises a list of orders fulfilled by the picker.

19. The computer system of claim 15, wherein the user interface further comprises an unconfirmed spread of the picker, wherein the unconfirmed spread indicates a total value of unmatched items in orders fulfilled by the picker.

20. The computer system of claim 15, the actions further comprising:
responsive to determining that the fraud total for the picker exceeds a threshold, deactivating an account of the picker; and
responsive to receiving an appeal indication from the picker regarding deactivation of the account of the picker, displaying, via the user interface at the auditor client device, fraud instances associated with the picker.

* * * * *